United States Patent
Hammond (10) Patent No.: US 9,537,875 B2
(45) Date of Patent: Jan. 3, 2017

(54) HANDLING POTENTIALLY MALICIOUS COMMUNICATION ACTIVITY

(71) Applicant: Metaswitch Networks Ltd, Enfield (GB)

(72) Inventor: David Hammond, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 14/194,483

(22) Filed: Feb. 28, 2014

(65) Prior Publication Data

US 2014/0181977 A1     Jun. 26, 2014

Related U.S. Application Data

(63) Continuation of application No. PCT/GB2012/052146, filed on Aug. 31, 2012.

(30) Foreign Application Priority Data

Aug. 31, 2011   (GB) .................................. 1115023.2

(51) Int. Cl.
*H04L 29/06*     (2006.01)

(52) U.S. Cl.
CPC ........... *H04L 63/14* (2013.01); *H04L 63/1458* (2013.01); *H04L 63/1425* (2013.01)

(58) Field of Classification Search
CPC ... H04L 63/14; H04L 63/1425; H04L 63/1458
(Continued)

(56) References Cited

U.S. PATENT DOCUMENTS 7,203,963 B1    4/2007  Wu et al.
7,698,548 B2 *  4/2010  Shelest et al. ................. 713/154
(Continued)

FOREIGN PATENT DOCUMENTS

EP      1393194 A2     3/2004
WO   2009-064114 A2    5/2009

OTHER PUBLICATIONS http://www.referenceforbusiness.com/small/Bo-Co/Communication-Systems.html, retrieved Aug. 14, 2015, 4 pages.*
(Continued)

*Primary Examiner* — Oleg Korsak
(74) *Attorney, Agent, or Firm* — EIP US LLP (57) ABSTRACT

At least some incoming traffic is distributed into a first set of traffic groups according to a first grouping scheme. Communication activity from a potentially malicious source may be grouped in a given traffic group in which communication activity from an acceptable source is also grouped. Potentially malicious communication activity is detected in the given traffic group. Traffic in the given traffic group is processed using a first traffic processing mode associated with potentially malicious communication activity, in which at least some traffic that is distributed into the given traffic group is discarded. In response to a dynamic trigger the grouping scheme is altered to one or more further grouping schemes in order that the communication activity from the acceptable source is likely to be subsequently grouped into a traffic group which is different to a group into which the communication activity from the potentially malicious source is subsequently grouped.

15 Claims, 4 Drawing Sheets

(58) Field of Classification Search
USPC .......................................................... 726/23
See application file for complete search history.

(56) References Cited

U.S. PATENT DOCUMENTS

| | | | |
|---|---|---|---|
| 7,849,146 | B2 | 12/2010 | Choi et al. |
| 7,882,556 | B2* | 2/2011 | Ahn et al. ....................... 726/13 |
| 2002/0035628 | A1 | 3/2002 | Gil et al. |
| 2003/0076848 | A1 | 4/2003 | Bremler-Barr et al. |
| 2003/0145232 | A1* | 7/2003 | Poletto et al. ................ 713/201 |
| 2003/0223361 | A1 | 12/2003 | Hussain et al. |
| 2004/0093521 | A1 | 5/2004 | Hamadeh et al. |
| 2005/0021842 | A1 | 1/2005 | Narayanan et al. |
| 2007/0109968 | A1 | 5/2007 | Hussain et al. |

OTHER PUBLICATIONS (https://en.wikipedia.org/wiki/Divide_and_conquer_algorithms, retrieved Aug. 14, 2015, 6 pages.*
3rd International Conference on Applied Cryptography and Network Security, Jun. 10, 2005, pp. 104-121 "Mitigating network Denial-Of-Service through diversity-based traffic management," Matrawy A. et al, INSPEC Accession No. 8556381.
International Search Report dated Mar. 7, 2013 issued on related application PCT/GB2012/052146 (published as WO/2013/030594 on Mar. 7, 2013).

* cited by examiner

HANDLING POTENTIALLY MALICIOUS COMMUNICATION ACTIVITY

CROSS-REFERENCE TO RELATED APPLICATIONS

This application is a continuation of International Application No. PCT/GB2012/052146, filed Aug. 31, 2012 (and published by the International Bureau on Mar. 7, 2013 as International Publication No. WO 2013/030594), which claims priority to GB Application No. GB 1115023.2, filed Aug. 31, 2011. Each of the above-referenced patent applications is hereby incorporated by reference in its entirety.

BACKGROUND OF THE INVENTION

The present application relates to a method of handling potentially malicious communication activity, a computer program product for enabling performance of such a method, and an apparatus for handling potentially malicious communication activity.

One of the hazards faced by servers and other communication devices that are exposed to public networks, such as the Internet, is that they may be subject to a Denial of Service (DoS) attack. During a conventional DoS attack, a number of remote hosts send a large amount of traffic to the server, in an attempt to overwhelm it.

A standard approach taken to deal with such attacks is rate-limiting. This involves categorizing incoming traffic into a set of source groups based on the source Internet protocol (IP) address, assigning a permitted maximum rate of incoming traffic per group, and rejecting any traffic from the group that would cause the rate limit to be exceeded. Unfortunately, this approach has a number of drawbacks.

One drawback is that state has to be stored in memory for each source group. Another drawback is that if the granularity of the source grouping is too small—in the extreme if there is just one IP address per group—then the grouping may take up a prohibitively large amount of memory.

However, if the traffic rate limit of a particular source group is exceeded, traffic is dropped from all traffic sources in the group. If there is one malicious traffic source in the group and several legitimate traffic sources, traffic from the legitimate sources is dropped along with the traffic from the malicious traffic source. The larger the granularity of the source group—that is the more source IP addresses there are in the source group—the larger the scope for collateral damage caused by blocking traffic from legitimate sources.

Most systems, therefore, trade off these two considerations. In general, they tend to use relatively large source groups in order to avoid running out of memory. However, this comes at the cost of potentially denying service to a substantial number of legitimate traffic sources that are in the same source group as the malicious traffic source.

It would be desirable to provide an improved method of and apparatus for handling such traffic.

SUMMARY

In accordance with a first embodiment, there is provided a method of handling potentially malicious communication activity in a communication system, including processing communication activity which is potentially malicious differently to communication activity which is acceptable, the method comprising: detecting potentially malicious communication activity in the given traffic group; distributing at least some incoming traffic into a first set of traffic groups according to a first grouping scheme such that communication activity from a potentially malicious source may be grouped in a given traffic group in which communication activity from an acceptable source is also grouped; processing the traffic in the given traffic group using a first traffic processing mode associated with potentially malicious communication activity, the first traffic processing mode comprising discarding at least some traffic, both from the acceptable source and the potentially malicious source, that is distributed into the given traffic group; processing the traffic in at least one other traffic group using a second traffic processing mode associated with acceptable communication activity; and in response to a dynamic trigger, altering the grouping scheme to one or more further grouping schemes and distributing at least some subsequent incoming traffic into one or more further sets of traffic groups according to the one or more further grouping schemes in order that the communication activity from the acceptable source is likely to be subsequently grouped into a traffic group which is different to a group into which the communication activity from the potentially malicious source is subsequently grouped.

In accordance with a second embodiment, there is provided an apparatus for handling potentially malicious communication activity in a communication system, including processing communication activity which is potentially malicious differently to communication activity which is acceptable, the apparatus being configured to: detect potentially malicious communication activity in the given traffic group; distribute at least some incoming traffic into a first set of traffic groups according to a first grouping scheme such that communication activity from a potentially malicious source may be grouped in a given traffic group in which communication activity from an acceptable source is also grouped; process the traffic in the given traffic group using a first traffic processing mode associated with potentially malicious communication activity, the first traffic processing mode comprising discarding at least some traffic, both from the acceptable source and the potentially malicious source, that is distributed into the given traffic group; process the traffic in at least one other traffic group using a second traffic processing mode associated with acceptable communication activity; and in response to a dynamic trigger, alter the grouping scheme to one or more further grouping schemes and distributing at least some subsequent incoming traffic into one or more further sets of traffic groups according to the one or more further grouping schemes in order that the communication activity from an acceptable source is likely to be subsequently grouped into a traffic group which is different to a group into which the communication activity from the potentially malicious source is subsequently grouped.

In accordance with a third embodiment, there is provided a computer program product comprising a non-transitory computer-readable storage medium having computer readable instructions stored thereon, the computer readable instructions being executable by a computerized device to cause the computerized device to perform a method of handling potentially malicious communication activity in a communication system, including processing communication activity which is potentially malicious differently to communication activity which is acceptable, the method comprising: detecting potentially malicious communication activity in the given traffic group; distributing at least some incoming traffic into a first set of traffic groups according to a first grouping scheme such that communication activity from a potentially malicious source may be grouped in a given traffic group in which communication activity from an acceptable source is also grouped; processing the traffic in the given traffic group using a first traffic processing mode associated with potentially malicious communication activity, the first traffic processing mode comprising discarding at least some traffic, both from the acceptable source and the potentially malicious source, that is distributed into the given traffic group; processing the traffic in at least one other traffic group using a second traffic processing mode associated with acceptable communication activity; and in response to a dynamic trigger, altering the grouping scheme to one or more further grouping schemes and distributing at least some subsequent incoming traffic into one or more further sets of traffic groups according to the one or more further grouping schemes in order that the communication activity from an acceptable source is likely to be subsequently grouped into a traffic group which is different to a group into which the communication activity from the potentially malicious source is subsequently grouped.

Further features and advantages will become apparent from the following description of preferred embodiments, given by way of example only, which is made with reference to the accompanying drawings.

DETAILED DESCRIPTION OF CERTAIN INVENTIVE EMBODIMENTS

Figure 1:
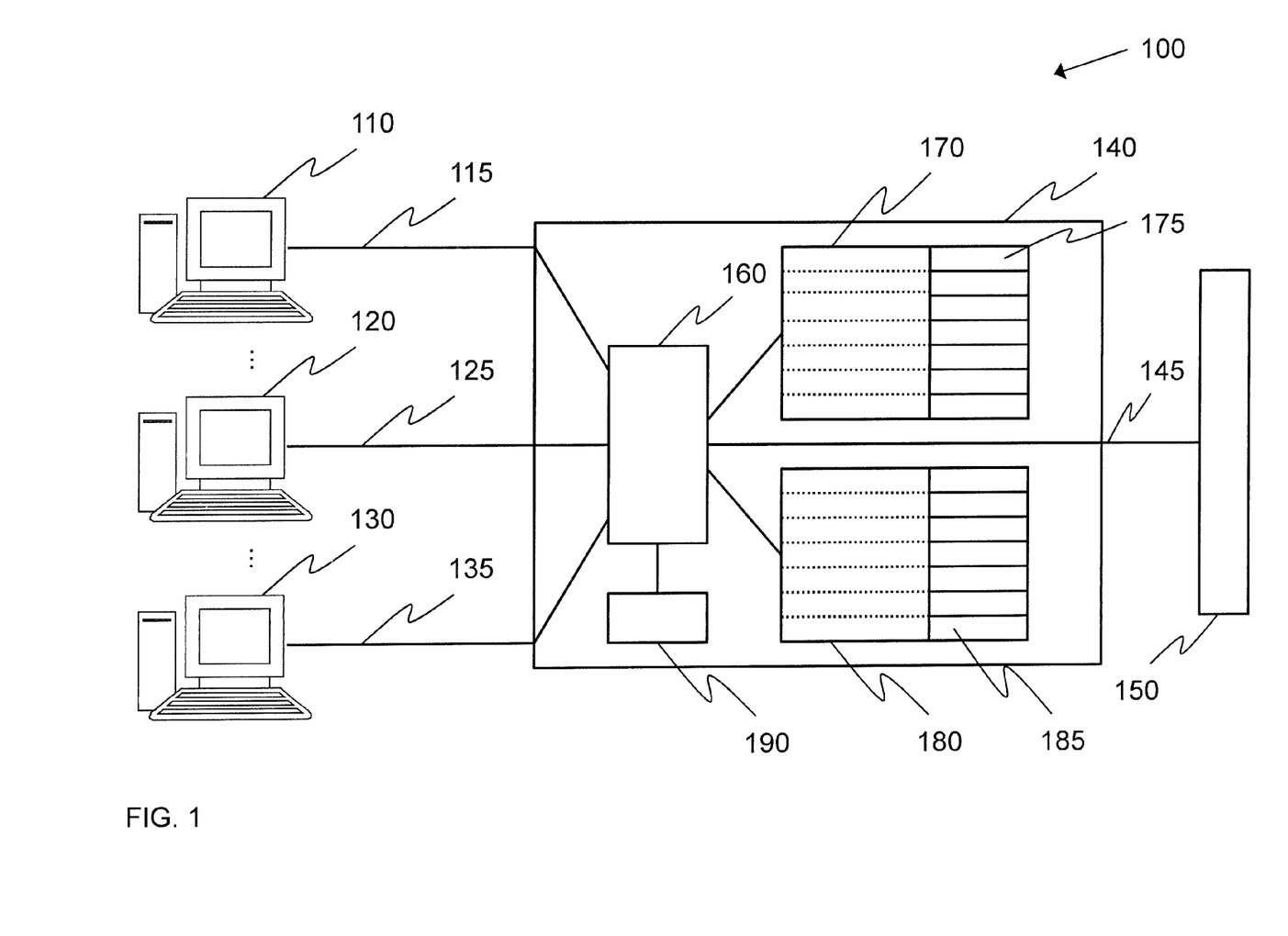
FIG. 1 is a schematic block representation of a communication system according to some embodiments.

FIG. 1 is a schematic block representation of a communication system 100 according to some embodiments.

The communication system 100 includes a plurality of traffic sources 110, 120, 130, a traffic handler 140, and a server system 150 that is liable to being attacked.

In some embodiments, the traffic sources 110, 120, and 130 are computing devices, such as Personal Computers (PCs). The traffic sources 110, 120, and 130 are communicatively connected to the traffic handler 140 via respective communication links 115, 125, and 135. Although shown as single links in FIG. 1, it will be appreciated that the traffic sources 110, 120, and 130 may be connected to the traffic handler 140 via one or more intermediate nodes, such as switches, bridges, hubs, routers and the like. Although only three traffic sources (110, 120, and 130) are shown in FIG. 1, the communication system 100 may include many more traffic sources.

The server system 150 that is liable to being attacked may be one more central servers of an organization, one or more gateways to the organization or the like. The server system 150 is communicatively connected to the traffic handler 140 by means of a communication link 145.

The traffic handler 140 is responsible for handling potentially malicious communication activity in the communication system 100 and acts to protect the server system 150 from malicious activity, such as DoS attacks. The traffic handler includes one or more processors 160 that are arranged to handle traffic processing. The traffic handler 150 is arranged to categorize incoming traffic from the traffic sources 110, 120, and 130 and to process communication activity that is categorized as potentially malicious differently than communication activity that is categorized as acceptable. In certain embodiments, the traffic handler 140 comprises at least one processor (for example processor 160) and at least one memory including computer program code (not shown). The at least one memory and the computer program code are configured to, with the at least one processor, cause the traffic handler 140 to perform a method of handling potentially malicious communication activity.

In use, the traffic handler 140 receives incoming traffic from the plurality of traffic sources 110, 120, and 130. The traffic handler 140 distributes at least some of the incoming traffic into a first set 170 of traffic groups according to a first grouping scheme.

The traffic handler 140 may select the number of traffic groups, N, in the first set 170 based on at least one trade off decision which takes into account reliability and/or scalability requirements for the communication system 100. For example, a larger number of traffic groups, N, causes less disruption for legitimate traffic sources because legitimate traffic is less likely to be distributed into the same traffic group as traffic from a malicious traffic source as the number of traffic groups is increased. However, a larger number of traffic groups, N, requires more memory usage to store state relating to each of the traffic groups. Therefore, the traffic handler 140 may select the number of traffic groups, N, in the first set 170 on the basis of trading off minimizing disruption to legitimate traffic sources against increased memory usage. By way of an example, the number of traffic groups, N, may be selected to be 4,096 (or $2^{12}$).

The traffic handler 140 detects potentially malicious communication activity in a given traffic group in the first set 170 based on at least one characteristic of the traffic distributed into the given traffic group, categorizes communication activity in the given traffic group in the first set 170 as potentially malicious communication activity, and processes the traffic in the given traffic group using a first traffic processing mode associated with potentially malicious activity.

In some embodiments, the at least one characteristic may include the amount of traffic distributed into the given traffic group in a given time period. In some such embodiments, the traffic handler 140 may monitor an amount of traffic distributed into a particular traffic group in the first set 170 and may detect potentially malicious communication activity in the particular traffic group if the amount of traffic distributed into the traffic group exceeds a threshold value. In some embodiments, the threshold value may be a threshold rate limit, R. In such embodiments, the traffic handler 140 categorizes the communication activity in the particular group as potentially malicious communication activity if the amount of traffic categorized into the particular group in a monitoring time period, T, exceeds the threshold rate limit, R, for that particular group.

In some embodiments, each traffic group in the first set 170 may be associated with the same threshold rate limit, R, and each traffic group may be monitored for the same monitoring time period, T. In other embodiments, different groups in the first set may be associated with different threshold rate limits, R, and/or different monitoring time periods, T.

In some embodiments, the traffic handler 140 selects the monitoring time period, T, based on at least one trade off decision which takes into account reliability and/or scalability requirements for the communication system 100. For example, shorter monitoring time periods, T, may cause less disruption to legitimate traffic sources whose traffic is distributed into a traffic group in which potentially malicious communication activity is detected than longer monitoring time periods, T. However, the traffic handler 140 is more sensitive to variances in legitimate incoming traffic rates over shorter monitoring time periods, T. Therefore, the traffic handler 140 may select the monitoring time period, T, on the basis of trading off minimizing disruption to legitimate traffic sources against increased sensitivity to fluctuations in legitimate incoming traffic rates. By way of an example, the monitoring time period, T, may be selected to be 200 milliseconds (ms).

In some embodiments, a traffic counter 175 is associated with each of the traffic groups in the first set 170 in order to count the amount of traffic being distributed into that traffic group during the monitoring time period, T. If the counter 175 associated with a given traffic group indicates that the amount of traffic exceeds the threshold rate limit, R, for the given group, further traffic, whether originating from a legitimate or a potentially malicious source, that is distributed into the given traffic group is processed using the first traffic processing mode associated with potentially malicious activity.

The size of the counter 175 used to count the amount of traffic distributed into a particular traffic group may be selected based on the product of the interface line-rate and the monitoring time period, T. This value is equal to the maximum amount of traffic that could be distributed into a particular traffic group before the counter 175 for the particular traffic group is reset. If the value is less than, for example, $2^{32}$, then a 32-bit counter 175 may be used; otherwise, a 64-bit counter 175 may be used.

In some embodiments, the first traffic processing mode associated with potentially malicious activity includes dropping or discarding at least some further traffic distributed into the given traffic group during the remainder of the monitoring time period, T. In some embodiments, the first traffic processing mode associated with potentially malicious activity includes forwarding at least some further traffic distributed into the given traffic group to a traffic analyzer 190 during the remainder of the monitoring time period, T. In such embodiments, potentially malicious traffic can be analyzed, for example, to attempt to identify a potentially malicious traffic source from which the potentially malicious traffic was transmitted.

The traffic handler 140 categorizes communication activity in at least one other traffic group in the first set 170 as acceptable communication activity and processes the traffic in the at least one other traffic group using a second traffic processing mode associated with acceptable activity.

In some embodiments, the second traffic processing mode associated with acceptable activity involves forwarding the traffic to the server system 150. In some embodiments, the traffic handler 140 processes traffic that is distributed into a traffic group using the second traffic processing mode associated with acceptable activity unless and until it categorizes communication activity in the traffic group as potentially malicious communication activity, in which case it processes the traffic in the traffic group using the first traffic processing mode associated with potentially malicious activity.

In response to a dynamic trigger, the traffic handler 140 distributes at least some subsequent incoming traffic, received from a plurality of traffic sources 110, 120, and 130, into a second set 180 of traffic groups according to a second, different grouping scheme. The first grouping scheme is configured to group traffic originating from each of the different traffic sources 110, 120, and 130 into the given traffic group in the first set 170, and the second grouping scheme is configured to group traffic originating from at least some of the plurality of different traffic sources 110, 120, and 130 into at least two different traffic groups in the second set 180. Each of the traffic groups in the second set may be associated with a respective counter 185 that counts the amount of traffic being distributed into the traffic group with which it is associated.

In some embodiments, the dynamic trigger may be the expiration of the monitoring time period, T. In some embodiments, the dynamic trigger may be the detection of potentially malicious communication activity during a given monitoring time period, T. For example, it may be undesirable to change the grouping scheme every time the monitoring time period, T, expires if none of the communication activity in a preceding monitoring time period, T, was classified as potentially malicious communication activity.

In some embodiments, the traffic handler 140 intermittently or periodically selects different grouping schemes. The periodicity with which the traffic handler 140 selects different grouping schemes may be the same as the monitoring time period, T, an integer multiple of the monitoring time period, T, or some other time period.

In some embodiments, the first grouping scheme comprises using a first hashing scheme and the second grouping scheme comprises using a second hashing scheme.

In some embodiments, the traffic handler 150: uses at least one parameter in the at least some incoming traffic as an input to a first hashing scheme; uses an output of the first hashing scheme to distribute the at least some incoming traffic into the first set of traffic groups; uses at least one parameter in the at least some subsequent incoming traffic as an input to a second hashing scheme; and uses an output of the second hashing scheme to distribute the at least some subsequent incoming traffic into the second set of traffic groups. In some embodiments, the at least one parameter may be a traffic source identifier associated with a traffic source (e.g. 110, 120, or 130) from which the incoming traffic originates. In some such embodiments, the traffic source identifier may be an IP address and/or a port or transport of the traffic source (e.g. 110, 120, or 130) from which the traffic originates.

In some embodiments, the first and second grouping schemes may involve using a hash table. A hash table uses a hash function to map an input value into an output value. The hash function transforms the input value, sometimes called an input key, into an index. The index is used to identify an entry in the hash table in which the output value is sorted.

In some such embodiments, the input key to a hash function is a source identifier included in incoming traffic and the output value of the hash function is an integer in the set $\{0, \ldots, N-1\}$. The output of the hash function is used to identify a particular group in the first set 170 of N traffic groups to which the traffic having that identifier should be distributed. In some embodiments, the value stored in the entry associated with a particular integer in the set $\{0, \ldots, N-1\}$, and hence one of the traffic groups in the first set 170, may provide the counter value of the amount of traffic distributed into that traffic group in the monitoring time period, T.

In some embodiments, the traffic handler 140 uses a nondeterministic grouping scheme selection algorithm to select the first and second grouping schemes. In such embodiments, the first and second grouping schemes are not selected in a predictable manner.

In some cases, an attacker may wish to cause the traffic handler 140 to treat traffic from a given traffic source as being potentially malicious so that the traffic is handled using the first traffic processing mode associated with potentially malicious activity to deny or limit service to the given traffic source. In some cases, the attacker may be able to do this by spoofing its IP address in such a way that its traffic is distributed into the same traffic group as the given traffic source. This may be possible, for example, if the way in which traffic is grouped is predictable and/or if the grouping schemes are changed in a predictable way. By using the nondeterministic scheme selection algorithm, it is unlikely that the attacker can predict which grouping scheme the traffic handler 140 is using at any given time and the grouping scheme that the traffic handler 140 is likely to use when it changes the grouping scheme. Thus, the impact of the attacker on the legitimate source is minimized.

As explained above, the grouping schemes may involve using hash algorithms to distribute the traffic into the traffic groups. In some such cases, the grouping schemes may be changed by changing a parameter, such as a seed, in a given hash algorithm each time the grouping scheme is to be changed. In these cases, the grouping schemes may use a "randomized" hash algorithm. In other such cases, the grouping schemes may be changed by changing the hash algorithm itself each time the grouping scheme is to be changed.

In this way, the first grouping scheme is configured to group traffic originating from each of a plurality of different traffic sources into the given traffic group in the first set 170 and the second grouping scheme is configured to group traffic originating from at least some of the plurality of different traffic sources into at least two different traffic groups in the second set 180. As such, the collateral effect of potentially malicious communication activity on legitimate traffic sources is minimized. In particular, assuming that the grouping scheme substantially uniformly distributes traffic across the traffic groups, any given legitimate traffic source has only a 1/N chance of its traffic being distributed into the same traffic group as the traffic from a potentially malicious traffic source in a particular monitoring time period, T.

Furthermore, any disruption to the traffic from a legitimate traffic source only lasts until the traffic handler 140 redistributes the traffic from the legitimate traffic source according to the second grouping scheme. After the redistribution, the probability of subsequent traffic from the legitimate traffic source being distributed into a different traffic group to the traffic from the potentially malicious traffic source is $(N-1)/N=1-1/N$.

Furthermore, since the second grouping scheme is different from the first grouping scheme, it is difficult for a malicious entity to deny service to a legitimate traffic source by spoofing its source address in an attempt to force the traffic handler 140 to distribute its traffic into the same traffic group as the traffic from the legitimate source because the malicious entity only has a limited time during which to analyze the first grouping scheme before the traffic handler 140 distributes the subsequent incoming traffic according to the second, different grouping scheme.

In some embodiments, selecting the first and second grouping schemes may comprise selecting a plurality of hash algorithms, H(I,S), each of which maps an input, I, to an output number between 0 and N−1, where 'N' is the number of traffic groups, using a random seed, S. In some embodiments, the hash algorithms are selected so that the output values of two different hash algorithms that have the same input, $H_i(I,S_i)$ and $H_j(I,S_j)$, are as uncorrelated as possible. As such, using the same input to hash algorithms with a different seed should be unlikely to produce the same output value.

In some embodiments, the hash algorithms are selected so that the output values of a given hash algorithm using two different input values, $H_i(I_1,S_i)$ and $H_j(I_2,S_j)$, are as uncorrelated as possible. As such, using two different inputs into the same hash algorithm with the same seed should be unlikely to produce the same output value.

In some embodiments, the hash algorithms may be relatively quick to calculate, for example having a time complexity of O (size of input) or less. In some embodiments, a relatively complex hash algorithm may be used as it may provide a more uniform distribution of output values. However, the performance cost of executing a large number of hash lookups, in the case of a relatively complex hash algorithm, could itself create a vulnerability in extreme cases since the traffic handler 140 could be overwhelmed by having to perform the large number of such hash lookups.

In some embodiments, the size of the random seed, S, may be selected to be the same as the size of the input, I, to the hash algorithm.

In some such embodiments, one possible hash algorithm performs a bitwise XOR operation on corresponding bits of the input, I, and the seed, S, and calculates the value of the resulting string modulo the number of traffic groups, N:H (I,S)=(I XOR S)modulo N.

In other such embodiments, another possible hash algorithm performs a bitwise XOR operation on corresponding bits of the input, I, and the seed, S, sums the result of each individual XOR operation and then calculates the result of the summation modulo the number of traffic groups, N:

$$H(I,S)=(I[0]XOR\ S[0]+I[1]XOR\ S[1]+\ldots I[m-1]\ XOR\ S[m-1])\mathrm{modulo}\ N,$$

where the input, I, and the seed, S, are both m-bit strings and where I[k] and S[k] are the $k^{th}$ bits of the input, I, and the seed, S, respectively.

In some embodiments, for example where the input, I, is an IPv4 address, which is made up of four bytes of address information, the first byte, I[0], of the input, I, is used as an index into an array, A, of the integers 0, . . . , N−1, where the arrangement of the integers within the array, A, is randomly shuffled by the seed, S. The value in the array, A, associated with that index is then XORed with the second byte, I[1], of the input, I, and the result of the XOR operation is used as an index into the array, A. The value from the array, A, associated with that index is then XORed with the third byte I[2], of the input, I, and so on until a final value from the array, A, is retrieved. The final value retrieved from the array, A, is one of the integers 0, . . . , N−1. This may be represented as:

$$H(I,S)=A[A[A[A[I[0]]XOR\ I[1]]XOR\ I[2]]XOR\ I[3]].$$

An example is now given of a situation in which there are $2^{17}$ (or 131,072) legitimate traffic sources that transmit audio traffic to the traffic handler 140, the audio traffic being destined for the server system 150. In this example, there are four malicious traffic sources and each transmits significant amounts of audio traffic to the traffic handler 140 in an attempt to overwhelm it. In line with some of the examples given above, the number of traffic groups, N, is 4096 and the monitoring time period, T, is 200 ms.

In any given monitoring time period, T, the probability of a legitimate traffic source having its traffic distributed into the same traffic group as that of a potentially malicious traffic source is 4×1/N=4×1/4096=1/1024. Since the monitoring time period, T, is 200 ms, in any given second, the probability of a legitimate traffic source having its traffic distributed into the same traffic group as that of a potentially malicious traffic source is 5×1/1024=5/1024. Therefore, a given legitimate traffic source is likely to have its traffic distributed into the same traffic group as a potentially malicious traffic source once every 1024/5≈205 seconds, or approximately once every 205/60≈3.5 minutes.

As such, each legitimate traffic source is likely to experience (up to) a 200 ms drop in their audio traffic approximately once every three-and-a-half minutes. This can be contrasted with an approach in which the grouping scheme is not changed, where approximately 4×(131072/4096)=128 legitimate traffic sources would have their traffic distributed into the same traffic group as the traffic from a potentially malicious traffic source for the entire duration of the potentially malicious communication activity. This may, at the least, significantly detract from user experience.

Handling traffic in a manner in which the grouping schemes are dynamically changed, therefore, has a relatively low impact on legitimate traffic sources. In particular, the traffic handler 140 effectively distributes the impact of potentially malicious communication activity across the legitimate traffic sources over time, such that a relatively large number of legitimate traffic sources may expect to experience a relatively minor disruption, rather than relatively few legitimate traffic sources expecting to experience severe disruption.

In some embodiments, the traffic handler 140 selects the number of traffic groups, N, the monitoring time period, T, and the threshold value, R, according to scalability and/or reliability requirements of the communication system 100.

In some embodiments, the number of traffic groups, N, is selected according to available memory constraints. For example, in some embodiments, each counter (175 and 185) associated with each traffic group stores thirty-two bits (four bytes), so that each counter (175 and 185) can record up to $2^{32}$ (or 4,294,967,296) traffic counts. In such cases, the memory required to implement the counters 175 and 185 for a total of 'N' traffic groups is 4×N bytes (or 32×N bits). As such, if a traffic handler 140 has between, for example, 100 kilobytes (kB) and 10 megabytes (MB) of spare memory for implementing such counters, the number of traffic groups, N, could be selected to be up to 10,000,000/4=2,500,000. In some embodiments, the number of traffic groups, N, may be selected with a constraint that it be a power of two since this can facilitate selection of a suitable hash scheme.

In practice, particularly large numbers of traffic groups, N, might not be desirable. This is because, for larger numbers of traffic groups, N, the threshold rate limit, R, for each traffic group is smaller. The smaller the threshold rate limit, R, the more sensitive the traffic handler 140 is to fluctuations in the traffic from legitimate traffic sources. Larger numbers of traffic groups, N, may also increase the processing overhead each time the grouping scheme is changed, since each of the counters for each of the (large number of) traffic groups is reset upon expiration of the monitoring time period, T. In practice, therefore, the number of traffic groups, N, may generally be selected in the range of 4,000 to 100,000 in order to trade off the above considerations.

In some embodiments, the monitoring time period, T, may be selected so that any processing of legitimate traffic using the first traffic processing mode associated with potentially malicious communication activity is substantially unnoticeable to a user of the legitimate traffic source. If the traffic is multimedia traffic, then the extent to which such processing is noticeable depends upon human perception times. For example, loss of multimedia traffic for periods over one second is likely to be clearly noticeable and may noticeably detract from user experience. However, loss of multimedia traffic for periods under one second are less likely to be clearly noticeable and, thus, are unlikely to detract from user experience.

However, similarly to increasing the number of traffic groups, N, reducing the monitoring time period, T, increases the processing overhead on the traffic handler 140 in that the grouping scheme may need to be changed relatively more frequently and any counters may also need to be reset relatively more frequently. Furthermore, shorter monitoring time periods, T, also make the traffic handler 140 more sensitive to fluctuations in traffic from legitimate traffic sources.

Once the number of traffic groups, N, and the monitoring time period, T, have been selected, the threshold rate limit, R, may also be selected. In some embodiments, the threshold rate limit, R, may be calculated to be:

$$R = \frac{P \times T}{N},$$

where 'P' is the maximum amount of traffic that the traffic handler 140 can handle per second. In practice, the threshold rate limit, R, could be set at 50% to 100% above the value calculated using the above formula. This may provide better handling of bursts of legitimate traffic. However, the traffic handler 140 may need to implement other rate-limiting mechanisms to handle situations in which the amount of traffic in each of the traffic groups exceeds the threshold rate limit, R.

In some embodiments, the traffic handler 140 classifies at least some incoming traffic into at least one traffic class, a given traffic class being associated with a given class of incoming traffic and distributes traffic in a traffic class according to the first grouping scheme if the traffic class is to be subject to potentially malicious communication activity handling.

For example, the traffic handler 140 may be able to handle a variety of traffic types, for example signaling and media traffic types. The different traffic types may each have different overall bandwidth requirements, processing priorities, or the like. The above-described handling of potentially malicious communication activity may be performed on a subset of the incoming traffic in a particular traffic class that is subject to malicious communication activity handling. For example, the traffic handler 140 may classify the incoming traffic into "signaling" and "media" traffic classes, and may only subject the traffic in the media traffic class to potentially malicious communication activity handling. In some embodiments, some traffic sources may be exempt from potentially malicious communication activity handling if, for example, they are "premium subscribers" or if they are designated as being "safe" traffic sources. In such embodiments, traffic associated with those traffic sources may be classified into a traffic class that is not to be subject to potentially malicious communication activity handling.

In some embodiments, the traffic handler 140 detects potentially malicious communication activity in a given traffic group in the second set 180 based on at least one characteristic of the traffic distributed into the given traffic group, categorizes the traffic in the given traffic group as potentially malicious, and processes the given traffic group using malicious activity processing. The traffic handler 140 may also identify at least one traffic source in the given traffic group (e.g. traffic groups 170 and 180) as a potentially malicious traffic source. Such identification may be performed by the traffic analyzer 190.

Figure 2A:
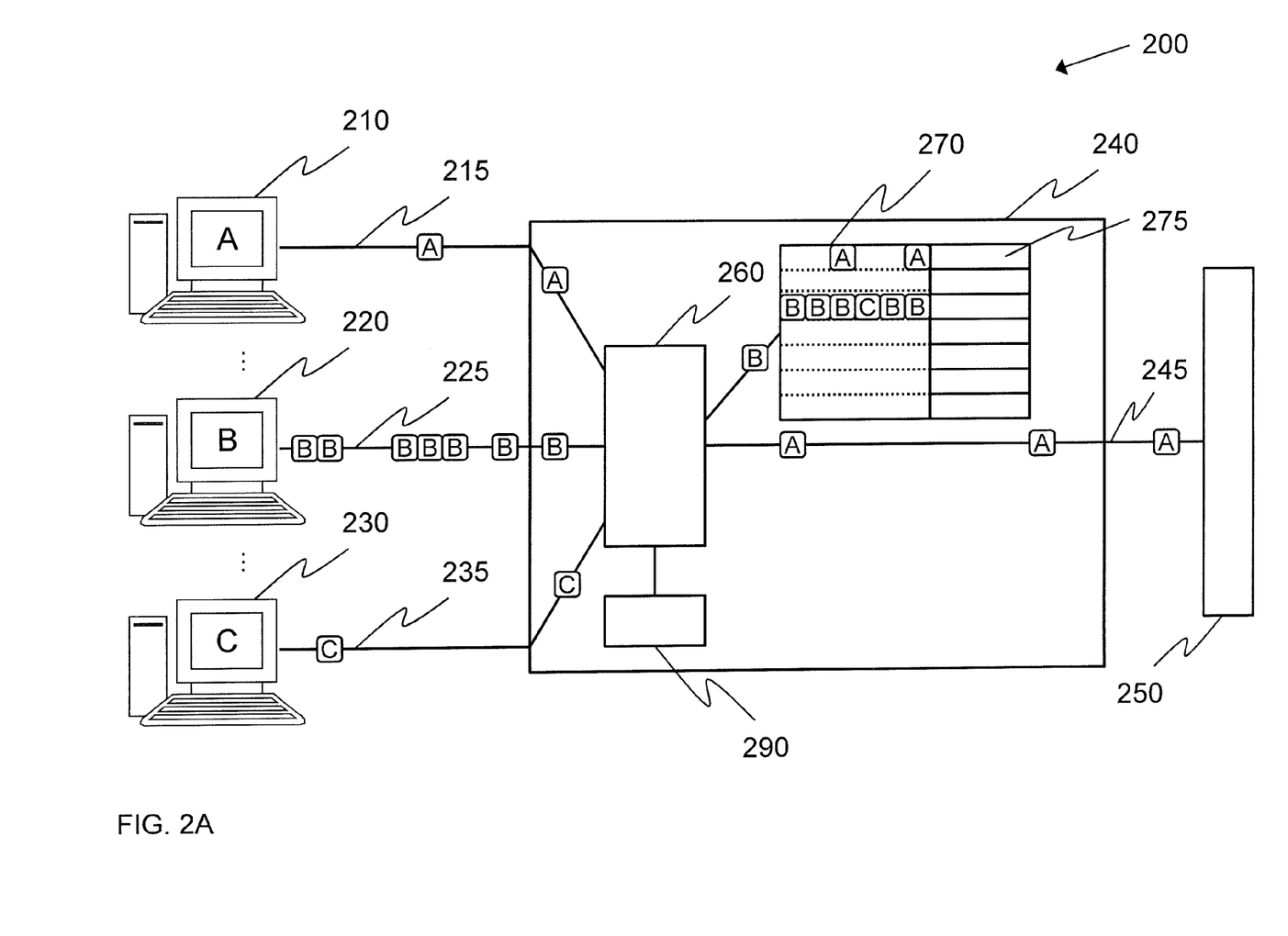
FIGS. 2A and B are schematic block representations of a communication system in which a traffic handler is handling traffic according to some embodiments.
Figure 2B:
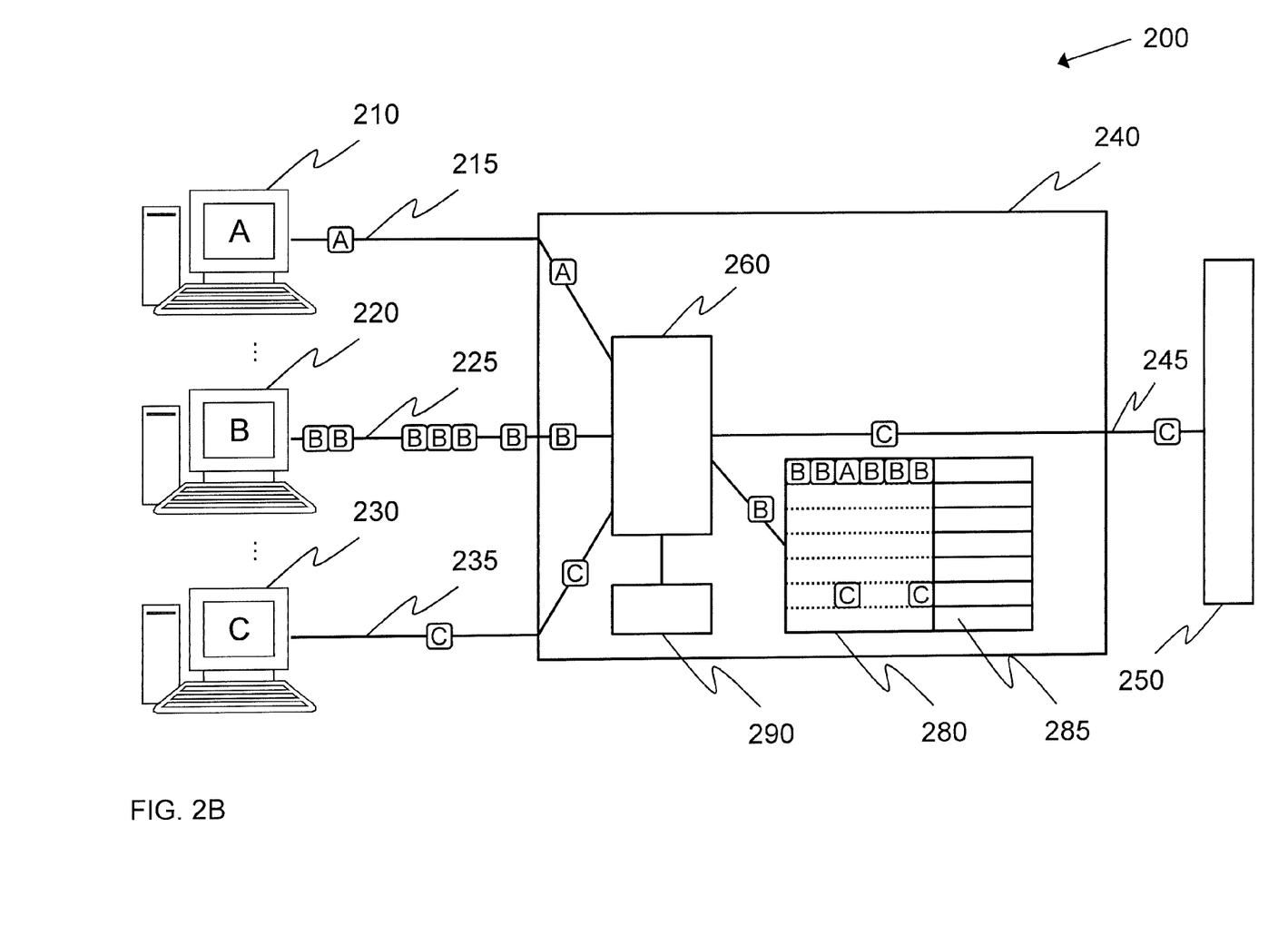

FIGS. 2A and 2B are schematic block representations of a communication system 200 in which a traffic handler 240 is handling traffic according to some embodiments. Similar elements between FIG. 1 and FIGS. 2A and 2B are shown and described using the same reference number but incremented by 100.

One of the traffic sources 220, labelled in FIGS. 2A and 2B and described herein as traffic source B, is a potentially malicious traffic source. The other two traffic sources 210, 230, labelled in FIGS. 2A and 2B and described herein as traffic sources A and C respectively, are legitimate traffic sources. All three traffic sources 210, 220, and 230 are transmitting traffic to the traffic handler 240. Traffic from a particular traffic source 210, 220, or 230 is identifiable in FIGS. 2A and 2B by the letter associated with the particular traffic source 210, 220, or 230 from which it originates. It will be appreciated that there may be many more traffic sources in the communication system than the three shown in FIGS. 2A and 2B.

As shown in FIG. 2A, the traffic handler 240 receives incoming traffic from traffic sources 210, 220, and 230 and distributes at least some of the incoming traffic into a first set of traffic groups 270 according to a first grouping scheme. In this case, the traffic handler 240 distributes the traffic from legitimate traffic source 210 into a first group in the first set 270 and the traffic from potentially malicious traffic source 220 and legitimate traffic source 230 into a second group in the first set 270. The traffic handler 240 detects potentially malicious communication activity in the second group in the first set 270 based on at least one characteristic of the traffic distributed into the second traffic group in the first set 270. The at least one characteristic may be the total amount of traffic distributed into the second group in the first set 270. The traffic handler 240 categorizes communication activity in the second traffic group in the first set 270 as potentially malicious communication activity and processes the traffic in the second traffic group in the first set 270 using the first traffic processing mode associated with potentially malicious activity. This may involve dropping some or all of the traffic distributed into the second traffic group in the first set 270. The traffic handler 240 categorizes communication activity in the first traffic group in the first set 270 as acceptable communication activity and processes the traffic in the first traffic group in the first set 270 using the second traffic processing mode associated with acceptable activity. This may involve forwarding the traffic distributed into the first traffic group in the first set 270 to the server system 250.

The traffic handler 240 receives subsequent incoming traffic from traffic sources 210, 220, and 230 as shown in FIG. 2B. In response to a dynamic trigger, the traffic handler 240 distributes at least some of the subsequent incoming traffic into a second set of traffic groups 280 according to a second, different grouping scheme. In this case, the traffic handler 240 distributes the traffic from legitimate traffic source 210 and from potentially malicious traffic source 220 into a first group in the second set 280 and the traffic from legitimate traffic source 230 into a second group in the second set 280.

As such, the first grouping scheme groups traffic originating from traffic sources 220 and 230, into a single group (the second group) in the first set 270, and the second grouping scheme groups traffic originating from traffic sources 220 and 230, into at two different traffic groups in the second set 280 (the first and second).

The traffic handler 240 detects potentially malicious communication activity in the first group in the second set 280 based on at least one characteristic of the traffic distributed into the first traffic group in the second set 280. The at least one characteristic may be the total amount of traffic distributed into the first traffic group in the second set 280. The traffic handler 240 categorizes communication activity in the first traffic group in the second set 280 as potentially malicious communication activity and processes the traffic in the first traffic group in the second set using the first traffic processing mode associated with potentially malicious activity. This may involve dropping some or all of the traffic distributed into the first traffic group in the second set 280. The traffic handler 240 categorizes communication activity in the second traffic group in the second set 280 as acceptable communication activity and processes the traffic in the second traffic group in the second set 280 using the second traffic processing mode associated with acceptable activity. This may involve forwarding the traffic distributed into the second traffic group in the second set 280 to the server system 250.

As such, the activity of potentially malicious traffic source 220 has a relatively low impact on both of the legitimate traffic sources 210 and 230, compared to what would have been a relatively high impact on traffic source 230, had the grouping scheme not been changed in response to the event trigger.

Figure 3:
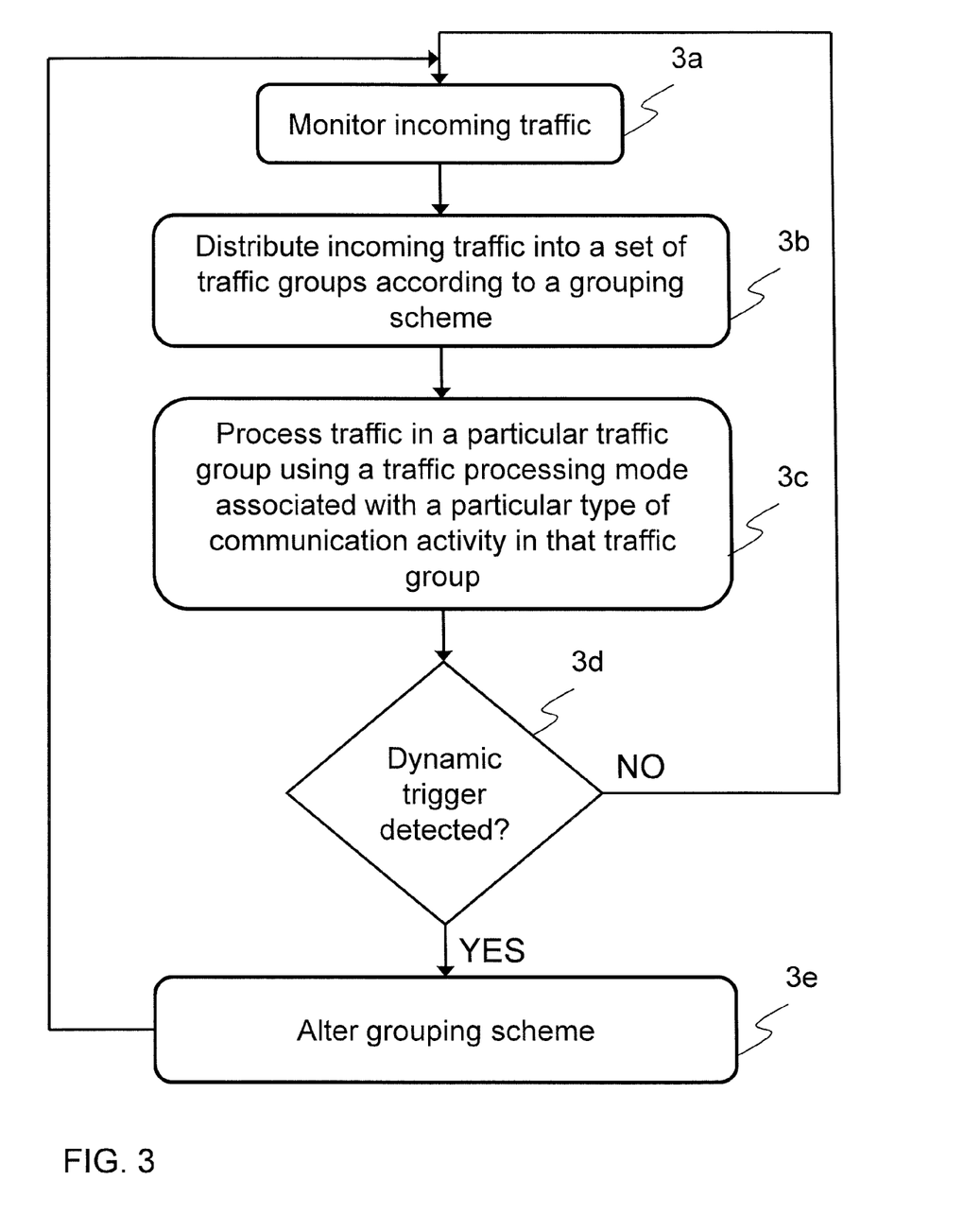
FIG. 3 is a flowchart showing a method of handling potentially malicious communication activity according to some embodiments.

FIG. 3 is a flowchart showing a method of handling potentially malicious communication activity according to some embodiments.

At step 3a, incoming traffic is monitored.

At step 3b, the incoming traffic is distributed into a set of traffic groups according to a grouping scheme. In some cases, at least some incoming traffic is distributed into a first set of traffic groups according to a first grouping scheme. Consequently, communication activity from a potentially malicious source may be grouped in a given traffic group in which communication activity from an acceptable source is also grouped.

At step 3c, traffic in a particular traffic group is processed using a traffic processing mode associated with a particular type of communication activity in that traffic group. In some cases, the traffic in the given traffic group is processed using a first traffic processing mode associated with potentially malicious communication activity and the traffic in at least one other traffic group is processed using a second traffic processing mode associated with acceptable communication activity.

At step 3d, a decision is made as to whether or not a dynamic trigger is detected. If the result of the decision of step 3d is that the dynamic trigger is not detected, then processing returns to step 3a, where incoming traffic is monitored. If, however, the result of the decision of step 3d is that the dynamic trigger is detected, then the grouping scheme is altered at step 3e and processing returns to step 3a where incoming traffic is monitored.

In accordance with some embodiments, a method of handling potentially malicious communication activity in a communication system, including processing communication activity which is potentially malicious differently to communication activity which is acceptable, is provided. Potentially malicious communication activity in the given traffic group is detected. At least some incoming traffic is distributed into a first set of traffic groups according to a first grouping scheme such that communication activity from a potentially malicious source may be grouped in a given traffic group in which communication activity from an acceptable source is also grouped. The traffic in the given traffic group is processed using a first traffic processing mode associated with potentially malicious communication activity, the first traffic processing mode comprising discarding at least some traffic, both from the acceptable source and the potentially malicious source, that is distributed into the given traffic group. The traffic in at least one other traffic group is processed using a second traffic processing mode associated with acceptable communication activity. In response to a dynamic trigger, the grouping scheme is altered to one or more further grouping schemes and at least some subsequent incoming traffic is distributed into one or more further sets of traffic groups according to the one or more further grouping schemes in order that the communication activity from the acceptable source is likely to be subsequently grouped into a traffic group which is different to a group into which the communication activity from the potentially malicious source is subsequently grouped.

Embodiments use a plurality of different grouping schemes, which may be triggered dynamically, such that in some cases at least some of the plurality of different traffic sources that are grouped into a given traffic group in a first set are grouped into at least two different traffic groups in a second set. Consequently, the likelihood of potentially malicious communication activity impacting upon a legitimate traffic source in both the first and second groupings is reduced. In some embodiments, at least some of the traffic is not communicated to a device in the communication system, which may otherwise overwhelm the device.

Some embodiments comprise, in response to a dynamic trigger, distributing at least some subsequent incoming traffic into a second set of traffic groups according to a second, different grouping scheme. A first grouping scheme is configured to group traffic originating from each of a plurality of different traffic sources into a plurality of traffic groups in the first set, and the second grouping scheme is configured to group traffic originating from at least some of the plurality of different traffic sources into at least two different traffic groups in the second set.

Some embodiments comprise detecting potentially malicious communication activity in a given traffic group in a first set based on at least one characteristic of the traffic distributed into the given traffic group, categorizing communication activity in the given traffic group in the first set as potentially malicious communication activity and processing the traffic in the given traffic group using the first traffic processing mode, and categorizing communication activity in at least one other traffic group in the first set as acceptable communication activity and processing the traffic in the at least one other traffic group using the second traffic processing mode.

In some embodiments, the at least one characteristic includes an amount of traffic. An amount of traffic distributed into a traffic group is monitored and potentially malicious communication activity is detected if the amount of traffic in the traffic group exceeds a threshold value. Such embodiments provide a mechanism for detecting potentially malicious activity that is particularly suited to DoS attacks.

In some embodiments, a first grouping scheme comprises using a first hashing scheme and one or more further grouping schemes comprise using one or more further hashing schemes. Such embodiments may provide for efficient distribution of traffic into traffic groups using hashing schemes that are typically relatively fast to calculate and require relatively small amounts of memory usage.

In some embodiments, the first hashing scheme comprises using a first hash function and the one or more further grouping schemes comprise using one or more further hash functions.

Some embodiments comprise using at least one parameter in the at least some incoming traffic as an input to a first hashing scheme, using an output of the first hashing scheme to distribute the at least some incoming traffic into the first set of traffic groups, using at least one parameter in the at least some subsequent incoming traffic as an input to the one or more further hashing schemes, and using an output of the one or more further hashing schemes to distribute the at least some subsequent incoming traffic into the one or more further sets of traffic groups.

Hashing schemes used in some embodiments to distribute traffic, as explained above, are typically relatively fast to calculate and require relatively small amounts of memory usage. By using at least one parameter in the incoming traffic and the subsequent traffic as inputs to the first and second hashing schemes respectively, traffic can grouped according to at least one attribute of the traffic. In some embodiments, the parameter may be a source identifier associated with a traffic source from which the incoming traffic originated. In some such embodiments, the source identifier may be the source IP address of the traffic source from which the incoming traffic originated.

Some embodiments comprise using a nondeterministic grouping scheme selection algorithm to select the respective grouping schemes. Such embodiments may further minimize the impact of a potentially malicious traffic source on a legitimate traffic source in cases in which an attacker wishes to deny service to a given legitimate traffic source by analyzing a grouping scheme and attempting to have its traffic distributed into the same traffic group as the legitimate traffic source. By using the nondeterministic scheme selection algorithm, it is unlikely that the attacker will be able to predict which grouping scheme the traffic handler is using at any given time and the grouping scheme that the traffic handler is likely to use when it changes the grouping scheme. Thus, the impact of the attacker on the given source is minimized. Some embodiments may comprise changing the grouping scheme periodically.

In some embodiments, the dynamic trigger is repeatedly refreshed and a series of different grouping schemes are used in response to the trigger being refreshed. In some embodiments, the dynamic trigger is based on a timing characteristic. In some embodiments, the dynamic trigger is periodically or intermittently refreshed. In some embodiments, the dynamic trigger is refreshed upon the expiration of a monitoring time period over which an amount of traffic distributed into a traffic group is monitored. Such embodiments seek to minimize the impact of potentially malicious traffic sources on legitimate traffic sources by reliably changing to a further grouping scheme upon refreshing of the dynamic trigger.

In some embodiments, the first traffic processing mode associated with potentially malicious communication activity comprises dropping all of the traffic that is distributed into the traffic group in which the potentially malicious communication activity is detected. Such embodiments can be used to prevent all of the traffic from being communicated to a device in the communication system, which may otherwise overwhelm the device.

Some embodiments comprise processing traffic that is distributed into a traffic group using the second traffic processing mode associated with acceptable communication activity unless and until communication activity in the given traffic group in the first set is categorized as potentially malicious. Such embodiments seek to minimize the impact of potentially malicious traffic sources on legitimate traffic sources by processing at least some traffic using the second traffic processing mode associated with acceptable communication activity.

Some embodiments comprise classifying at least some incoming traffic into at least one traffic class, a given traffic class being associated with a given class of incoming traffic, and distributing traffic in a traffic class according to the first grouping scheme if the traffic class is to be subject to potentially malicious communication activity handling.

Some embodiments provide for different handling of different classes of incoming traffic. In some cases, certain types of incoming traffic may be more prone to being used in potentially malicious communication activity and can, therefore, be subject to such handling whereas certain other types of incoming traffic that may be less prone to being used in potentially malicious communication activity may not be subject to such handling. Incoming traffic may be classified based on attributes other than the type of incoming traffic, for example based on whether the traffic source from which traffic is received is associated with a premium subscriber or to a designated "safe" traffic source whose traffic is not to be subject to such handling.

Some embodiments comprise identifying at least one traffic source from which traffic is categorized as potentially malicious in the given traffic group in the first set and in a group in the one or more further sets, and identifying the at least one traffic source as a potentially malicious traffic source. Such embodiments facilitate identification of a potentially malicious traffic source. An appropriate action may be taken once the potentially malicious traffic source is identified.

In accordance with another embodiment, an apparatus for handling potentially malicious communication activity in a communication system, including processing communication activity which is potentially malicious differently to communication activity which is acceptable, is provided. The apparatus is configured to detect potentially malicious communication activity in the given traffic group; distribute at least some incoming traffic into a first set of traffic groups according to a first grouping scheme such that communication activity from a potentially malicious source may be grouped in a given traffic group in which communication activity from an acceptable source is also grouped; process the traffic in the given traffic group using a first traffic processing mode associated with potentially malicious communication activity, the first traffic processing mode comprising discarding at least some traffic, both from the acceptable source and the potentially malicious source, that is distributed into the given traffic group; process the traffic in at least one other traffic group using a second traffic processing mode associated with acceptable communication activity; and in response to a dynamic trigger, alter the grouping scheme to one or more further grouping schemes and distributing at least some subsequent incoming traffic into one or more further sets of traffic groups according to the one or more further grouping schemes in order that the communication activity from an acceptable source is likely to be subsequently grouped into a traffic group which is different to a group into which the communication activity from the potentially malicious source is subsequently grouped.

In accordance with another embodiment, a computer program product comprising a non-transitory computer-readable storage medium having computer readable instructions stored thereon is provided. The computer readable instructions are executable by a computerized device to cause the computerized device to perform a method of handling potentially malicious communication activity in a communication system, including processing communication activity which is potentially malicious differently to communication activity which is acceptable. The method of handling potentially malicious communication activity comprises detecting potentially malicious communication activity in the given traffic group; distributing at least some incoming traffic into a first set of traffic groups according to a first grouping scheme such that communication activity from a potentially malicious source may be grouped in a given traffic group in which communication activity from an acceptable source is also grouped; processing the traffic in the given traffic group using a first traffic processing mode associated with potentially malicious communication activity, the first traffic processing mode comprising discarding at least some traffic, both from the acceptable source and the potentially malicious source, that is distributed into the given traffic group; processing the traffic in at least one other traffic group using a second traffic processing mode associated with acceptable communication activity; and in response to a dynamic trigger, altering the grouping scheme to one or more further grouping schemes and distributing at least some subsequent incoming traffic into one or more further sets of traffic groups according to the one or more further grouping schemes in order that the communication activity from an acceptable source is likely to be subsequently grouped into a traffic group which is different to a group into which the communication activity from the potentially malicious source is subsequently grouped.

The above embodiments are to be understood as illustrative examples. Further embodiments are envisaged.

For example, although the traffic sources 110, 120, 130, 210, 220, and 230 have been described as being PCs, other communications devices, such as mobile telephones, laptop computers, tablet computing devices and the like, may serve as traffic sources.

In some of the embodiments described above, the first and second grouping schemes involve using a hash table. The use of a hash table facilitates quick changes from the first grouping scheme to the second grouping scheme because the array elements in the hash table can be cleared before the second grouping scheme is used and it is not necessary to reallocate memory when changing to the second grouping scheme. Furthermore, hash algorithms are fast to calculate, as they do not involve following pointers, and memory usage for hash algorithms is efficient, which reduces caching-related performance issues. However, the first and second grouping schemes may use another type of data structure, such as a trie.

Although some embodiments have been described above in which the traffic source identifier in the incoming traffic is a 32-bit, IP version 4 (IPv4 address), the traffic handler may be able to handle traffic in communication systems in which the source identifier is a different size. For example, the traffic handler may be able to handle 128-bit, IP version 6 (IPv6), addresses and may be scalable to potentially larger IP or other address spaces. In some cases, for example where the grouping scheme uses a hash algorithm and where the hash algorithm includes bitwise XORing of the source identifier, I, and a seed, S, the size of the random seed may be selected to be the same as that of the address space.

As explained above, various types of traffic, such as signaling and media traffic, may be subject to handling in the manners described above. In particular, particular types of traffic (such as standard audio or video telephony) where small losses are tolerable by end-users, or traffic which is in accordance with a protocol that includes error-correction or recovery, such as Transmission Control protocol (TCP) traffic, is well-suited to being processed in the manners described above. Support for other types of traffic is envisaged, for example to support future forms of media, such as 3D video.

In some embodiments described above, the server system that is liable to potentially malicious communication activity comprises one or more central servers of, or a gateway to, an organization. However, the above-described methods of handling potentially malicious communication activity are also applicable to peer-to-peer communications, where an individual host may be protected from overwhelming traffic, although such attacks on the host are likely to have a lesser impact on the communication system as a whole.

In some embodiments, a "leaky bucket" algorithm may be used in relation to each traffic group to process the traffic in that group. In such embodiments, a counter (such as counters 175, 185, 275, 285) associated with a particular traffic group is incremented as traffic is distributed into that particular traffic group. However, the counter may also be decremented periodically, at a predetermined rate. Normally, a processing mode is used (in which it can be said that the leaky bucket is not full) in which no incoming traffic is dropped. However, if the counter indicates an amount of traffic greater than a threshold value, the traffic handler may use a processing mode (in which it can be said that the leaky bucket is full) in which potentially malicious communication activity in the particular traffic group is discarded. Using a leaky bucket algorithm may provide better tolerance of traffic bursts from legitimate traffic sources, at a cost of storing more states on a per-traffic group basis.

Some embodiments provide a method of handling potentially malicious communication activity in a communication system, including processing communication activity which is potentially malicious differently to communication activity which is acceptable. The method comprises distributing at least some incoming traffic into a first set of traffic groups according to a first grouping scheme such that communication activity from a potentially malicious source may be grouped in a given traffic group in which communication activity from an acceptable source is also grouped; processing the traffic in the given traffic group using a first traffic processing mode associated with potentially malicious communication activity; processing the traffic in at least one other traffic group using a second traffic processing mode associated with acceptable communication activity; and in response to a dynamic trigger, altering the grouping scheme to one or more further grouping schemes and distributing at least some subsequent incoming traffic into one or more further sets of traffic groups according to the one or more further grouping schemes in order that the communication activity from the acceptable source is likely to be subsequently grouped into a traffic group which is different to a group into which the communication activity from the potentially malicious source is subsequently grouped. In some such embodiments, the first traffic processing mode associated with potentially malicious communication activity comprises dropping at least some traffic that is distributed into the traffic group in which the potentially malicious communication activity is grouped.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of handling potentially malicious communication activity in a communication system, including processing communication activity which is potentially malicious differently to communication activity which is acceptable, wherein the communication system comprises at least a traffic handler comprising at least one processor and at least one memory, the method comprising:

at the traffic handler, distributing at least some incoming media traffic into a first set of traffic groups according to a first grouping scheme such that communication activity from a potentially malicious source is grouped in a given traffic group in which communication activity from an acceptable source is also grouped;

at the traffic handler, processing the media traffic distributed into the given traffic group, both from the acceptable source and the potentially malicious source, using a traffic processing mode associated with acceptable communication activity until a threshold rate limit associated with the given traffic group is exceeded, wherein the threshold rate limit associated with the given traffic group is a maximum acceptable amount of media traffic during a monitoring time period associated with the given traffic group, wherein the traffic handler continues to receive traffic from both the acceptable source and the potentially malicious source during the monitoring time period;

at the traffic handler, detecting potentially malicious communication activity in the given traffic group in response to an amount of media traffic distributed into the given traffic group during the monitoring time period associated with the given traffic group exceeding the maximum acceptable amount of media traffic associated with the given traffic group;

at the traffic handler, in response to said detecting potentially malicious communication activity in the given traffic group, processing further media traffic distributed into the given traffic group using a first traffic processing mode associated with potentially malicious communication activity during a remainder of the monitoring time period, the first traffic processing mode comprising discarding at least some of the further media traffic, both from the acceptable source and the potentially malicious source, that is distributed into the given traffic group during the remainder of the monitoring time period; wherein the discarded further media traffic comprises traffic recognized by the traffic handler as traffic from the acceptable source as well as traffic from the potentially malicious source, and wherein the discarded further traffic is discarded during the remainder of the monitoring time period;

at the traffic handler, processing media traffic in at least one other traffic group using a second traffic processing mode associated with acceptable communication activity; and at the traffic handler, in response to a dynamic trigger, altering the grouping scheme to one or more further grouping schemes and distributing at least some subsequent incoming media traffic into one or more further sets of traffic groups according to the one or more further grouping schemes in order that the communication activity from the acceptable source is likely to be subsequently grouped into a traffic group which is different to a group into which the communication activity from the potentially malicious source is subsequently grouped.

2. The method according to claim 1, further comprising:
in response to the dynamic trigger, distributing at least some subsequent incoming traffic into a second set of traffic groups according to a second, different grouping scheme,
wherein the first grouping scheme is configured to group traffic originating from each of a plurality of different traffic sources into the given traffic group in the first set, and the second grouping scheme is configured to group traffic originating from at least some of the plurality of different traffic sources into at least two different traffic groups in the second set.

3. The method according to claim 1, further comprising:
detecting potentially malicious communication activity in the given traffic group in the first set based on at least one characteristic of the traffic distributed into the given traffic group;
categorizing communication activity in the given traffic group in the first set as potentially malicious communication activity and processing the traffic in the given traffic group using the first traffic processing mode; and
categorizing communication activity in at least one other traffic group in the first set as acceptable communication activity and processing the traffic in the at least one other traffic group using the second traffic processing mode.

4. The method according to claim 3, further comprising:
monitoring the amount of traffic distributed into the given traffic group.

5. The method according to claim 1, wherein the first grouping scheme comprises using a first hashing scheme and the one or more further grouping schemes comprise using one or more further hashing schemes.

6. The method according to claim 5, further comprising:
using at least one parameter in the at least some incoming traffic as an input to the first hashing scheme;
using an output of the first hashing scheme to distribute the at least some incoming traffic into the first set of traffic groups;
using at least one parameter in the at least some subsequent incoming traffic as an input to the one or more further hashing schemes; and
using an output of the one or more further hashing schemes to distribute the at least some subsequent incoming traffic into the one or more further sets of traffic groups.

7. The method according to claim 1, further comprising:
using a nondeterministic grouping scheme selection algorithm to select the first and the one or more further grouping schemes.

8. The method according to claim 1, wherein the dynamic trigger is repeatedly refreshed and a series of different grouping schemes are used in response to the trigger being refreshed.

9. The method according to claim 1, wherein the dynamic trigger is based on a timing characteristic.

10. The method according to claim 9, wherein the dynamic trigger is periodically or intermittently refreshed.

11. The method according to claim 1, wherein the first traffic processing mode associated with potentially malicious communication activity comprises dropping all of the further traffic that is distributed into the given traffic group.

12. The method according to claim 1, further comprising:
classifying at least some incoming traffic into at least one traffic class, a given traffic class being associated with a given class of incoming traffic; and
distributing traffic in a traffic class according to the first grouping scheme if the traffic class is to be subject to potentially malicious communication activity handling.

13. The method according to claim 1, further comprising:
identifying at least one traffic source from which traffic is categorized as potentially malicious in the given traffic group in the first set and in a group in the one or more further sets; and
identifying the at least one traffic source as a potentially malicious traffic source.

14. A traffic handler for handling potentially malicious communication activity in a communication system, the traffic handler being configured to process communication activity which is potentially malicious differently to communication activity which is acceptable, the traffic handler comprising at least one processor and at least one memory and being configured to:
distribute at least some incoming media traffic into a first set of traffic groups according to a first grouping scheme such that communication activity from a potentially malicious source is grouped in a given traffic group in which communication activity from an acceptable source is also grouped;
process the media traffic distributed into the given traffic group, both from the acceptable source and the potentially malicious source, using a traffic processing mode associated with acceptable communication activity until a threshold rate limit associated with the given traffic group is exceeded, wherein the threshold rate limit associated with the given traffic group is a maximum acceptable amount of media traffic during a monitoring time period associated with the given traffic group, wherein the traffic handler continues to receive media traffic from both the acceptable source and the potentially malicious source during the monitoring time period;
detect potentially malicious communication activity in the given traffic group in response to an amount of media traffic distributed into the given traffic group during the monitoring time period associated with the given traffic group exceeding the maximum acceptable amount of media traffic associated with the given traffic group;
in response to said potentially malicious communication activity in the given traffic group being detected, process media traffic distributed into the given traffic group using a first traffic processing mode associated with potentially malicious communication activity during a remainder of the monitoring time period, the first traffic processing mode comprising discarding at least some of the further media traffic, both from the acceptable source and the potentially malicious source, that is distributed into the given traffic group during the remainder of the monitoring time period, wherein the discarded further media traffic comprises media traffic recognized by the traffic handler as media traffic from the acceptable source as well as media traffic from the potentially malicious source, and wherein the discarded further media traffic is discarded during the remainder of the monitoring time period;
process media traffic in at least one other traffic group using a second traffic processing mode associated with acceptable communication activity; and in response to a dynamic trigger, alter the grouping scheme to one or more further grouping schemes and distributing at least some subsequent incoming media traffic into one or more further sets of traffic groups according to the one or more further grouping schemes in order that the communication activity from an acceptable source is likely to be subsequently grouped into a traffic group which is different to a group into which the communication activity from the potentially malicious source is subsequently grouped.

15. A computer program product comprising a non-transitory computer-readable storage medium having computer readable instructions stored thereon, the computer readable instructions being executable by a computerized device to cause the computerized device to perform a method of handling potentially malicious communication activity in a communication system comprising at least a traffic handler comprising at least one processor and at least one memory, including processing communication activity which is potentially malicious differently to communication activity which is acceptable, the method comprising:

distributing at least some incoming media traffic into a first set of traffic groups according to a first grouping scheme such that communication activity from a potentially malicious source is grouped in a given traffic group in which communication activity from an acceptable source is also grouped;

processing the media traffic distributed into the given traffic group, both from the acceptable source and the potentially malicious source, using a traffic processing mode associated with acceptable communication activity until a threshold rate limit associated with the given traffic group is exceeded, wherein the threshold rate limit associated with the given traffic group is a maximum acceptable amount of media a traffic during a monitoring time period associated with the given traffic group, wherein the traffic handler continues to receive media traffic from both the acceptable source and the potentially malicious source during the monitoring time period;

detecting potentially malicious communication activity in the given traffic group in response to an amount of media traffic distributed into the given traffic group during the monitoring time period associated with the given traffic group exceeding the maximum acceptable amount of media traffic associated with the given traffic group;

in response to said detecting potentially malicious communication activity in the given traffic group, processing further media traffic distributed into the given traffic group using a first traffic processing mode associated with potentially malicious communication activity during a remainder of the monitoring time period, the first traffic processing mode comprising discarding at least some of the further media traffic, both from the acceptable source and the potentially malicious source, that is distributed into the given traffic group during the remainder of the monitoring time period, wherein the discarded further media traffic comprises media traffic recognized by the traffic handler as media traffic from the acceptable source as well as media traffic from the potentially malicious source, and wherein the discarded further media traffic is discarded during the remainder of the monitoring time period;

processing media traffic in at least one other traffic group using a second traffic processing mode associated with acceptable communication activity; and in response to a dynamic trigger, altering the grouping scheme to one or more further grouping schemes and distributing at least some subsequent incoming media is traffic into one or more further sets of traffic groups according to the one or more further grouping schemes in order that the communication activity from an acceptable source is likely to be subsequently grouped into a traffic group which is different to a group into which the communication activity from the potentially malicious source is subsequently grouped.

\* \* \* \* \*